US006834690B2

(12) United States Patent
Michaud

(10) Patent No.: US 6,834,690 B2
(45) Date of Patent: Dec. 28, 2004

(54) APPARATUS FOR RECOVERING OIL AND PLASTIC FROM PLASTIC OIL CONTAINERS

(76) Inventor: Rino Michaud, 1263, rue Georges, Saint-Hubert, QC (CA), J4T 1V5

( * ) Notice: Subject to any disclaimer, the term of this patent is extended or adjusted under 35 U.S.C. 154(b) by 0 days.

(21) Appl. No.: 10/408,828

(22) Filed: Apr. 7, 2003

(65) Prior Publication Data

US 2004/0194849 A1 Oct. 7, 2004

(51) Int. Cl.$^7$ .................................................. B65B 1/04
(52) U.S. Cl. .................... 141/330; 141/86; 141/329; 141/1
(58) Field of Search .................... 141/86, 329, 330, 141/363–366, 1; 222/80–87

(56) References Cited

U.S. PATENT DOCUMENTS

| 4,961,440 | A | * | 10/1990 | Wright | .................... | 134/167 R |
| 5,114,043 | A | * | 5/1992 | Collins, Jr. | ................... | 222/86 |
| 6,237,654 | B1 | * | 5/2001 | Sheyer | ....................... | 141/330 |

* cited by examiner

Primary Examiner—Timothy L. Maust
(74) Attorney, Agent, or Firm—Eric Fincham

(57) ABSTRACT

An apparatus and method for recycling containers which use petroleum products, the apparatus having a housing, a perforated shelf within the housing, an assembly movable between upper and lower positions with assembly having a plurality of piercing members formed on an underside thereof, a drive member to move the assembly between the first and second positions, and liquid receiving means below the perforated shelf. Using the apparatus and method of the present invention, both the oil and the plastic containers may be recovered for recycling.

11 Claims, 5 Drawing Sheets

APPARATUS FOR RECOVERING OIL AND PLASTIC FROM PLASTIC OIL CONTAINERS

FIELD OF THE INVENTION

The present invention relates to an apparatus and method, and more particularly relates to an apparatus and method for recycling used petroleum products.

BACKGROUND OF THE INVENTION

The problem of recycling used petroleum products and in particular, used oil such as used in automotive vehicles, is one which has long existed and has been addressed by the industry. For the most part, a substantial of vehicle owners take their vehicle to a centre or depot is equipped for collecting the used oil and recycling the same.

However, a far larger problem exists for the do-it-yourself vehicle owner who will purchase the new oil and drain the old oil from the vehicle. For a long period of time, many such do-it-yourselfers merely allowed the oil to drain to the ground. However, through increased publicity and education, the do-it-yourselfer has been persuaded to recycle this oil. Generally, the do-it-yourselfer will place the oil in the containers for the new oil and will take it to an authorized disposal.

In many jurisdictions, it has been ruled that any outlet selling new oil must provide for disposal of the used oil—i.e. the vehicle owner is free to bring the used oil back to the retail outlet. This represents a substantial nuisance for the retail outlet since they must then open each one of the containers and drain the oil into a central receptacle. This can consume a substantial amount of employee time.

SUMMARY OF THE INVENTION

It is an object of the present invention to provide an apparatus to receive containers of used oil and which apparatus is designed to remove the oil therefrom.

It is a further object of the present invention to provide a method for the removal and recycling of oil from containers of the same.

According to one aspect of the present invention, there is provided a recycling apparatus suitable for use with containers of used petroleum products, the apparatus comprising a housing, a perforated shelf within the housing, the perforated shelf having apertures therein, an assembly movable between upper and lower positions, the assembly having a plurality of piercing members formed on an underside thereof, drive means for moving the assembly between the first and second positions, and liquid receiving means below the perforated shelf.

According to a further aspect of the present invention, there is provided a method of recovering used oil from a plurality of containers of the same, the method comprising the steps of providing a recycling apparatus having a housing, a perforated shelf within the housing, an assembly movable between upper and lower positions situated above the perforated shelf, the movable assembly having a plurality of piercing members formed on an underside thereof, providing an access opening to the perforated shelf whereby the consumer may place containers of used oil thereon, operating the movable assembly to pierce the containers, recovering the used oil from beneath the perforated shelf and transferring the used oil to a shipping container, and removing the plastic containers for recycling.

According to one aspect of the invention, the apparatus is designed to recover both the oil and the containers and to recycle both of the same. While the apparatus is particularly suitable for plastic containers, it can also be used for containers of other material—i.e. the metallic cans.

As aforementioned, the device comprises a plurality of piercing members which are designed to descend upon the containers which are placed on a screen or mesh. Any suitable type of screen in material may be used with the mesh size being sufficient to permit the passage of oil therethrough while retaining any smaller pieces of plastic thereon.

In a preferred embodiment, there are provided means for preventing any of the containers from remaining on the piercing members after the containers have been impaled and when the piercing members are withdrawn. Conveniently, this structure may comprise a movable screen which is movable between a first position outside the end of the piercing members and a second position adjacent to the base of the piercing members.

Drive means for moving the assembly may comprise any suitable and in the preferred embodiment, hydraulic drive means are utilized.

Suitable control circuitry may be provided as is well known in the art. Thus, such circuitry may include safety locks and the like to prevent the device from being operated when doors are open or the like.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
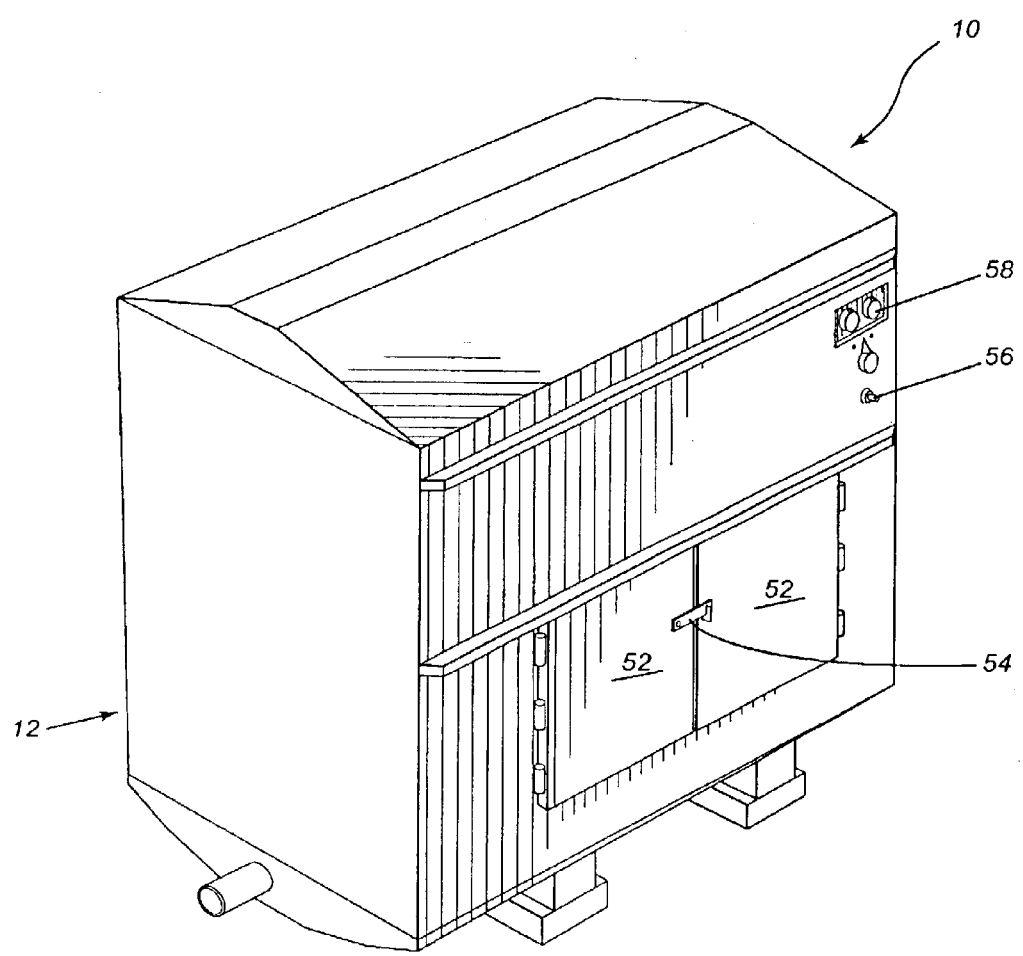
FIG. 1 is a perspective view of an apparatus according to an embodiment of the present invention.

Referring to the drawings in greater detail and by reference characters thereto, there is illustrated a oil and oil container recovery apparatus generally designated by reference numeral 10.

Figure 2:
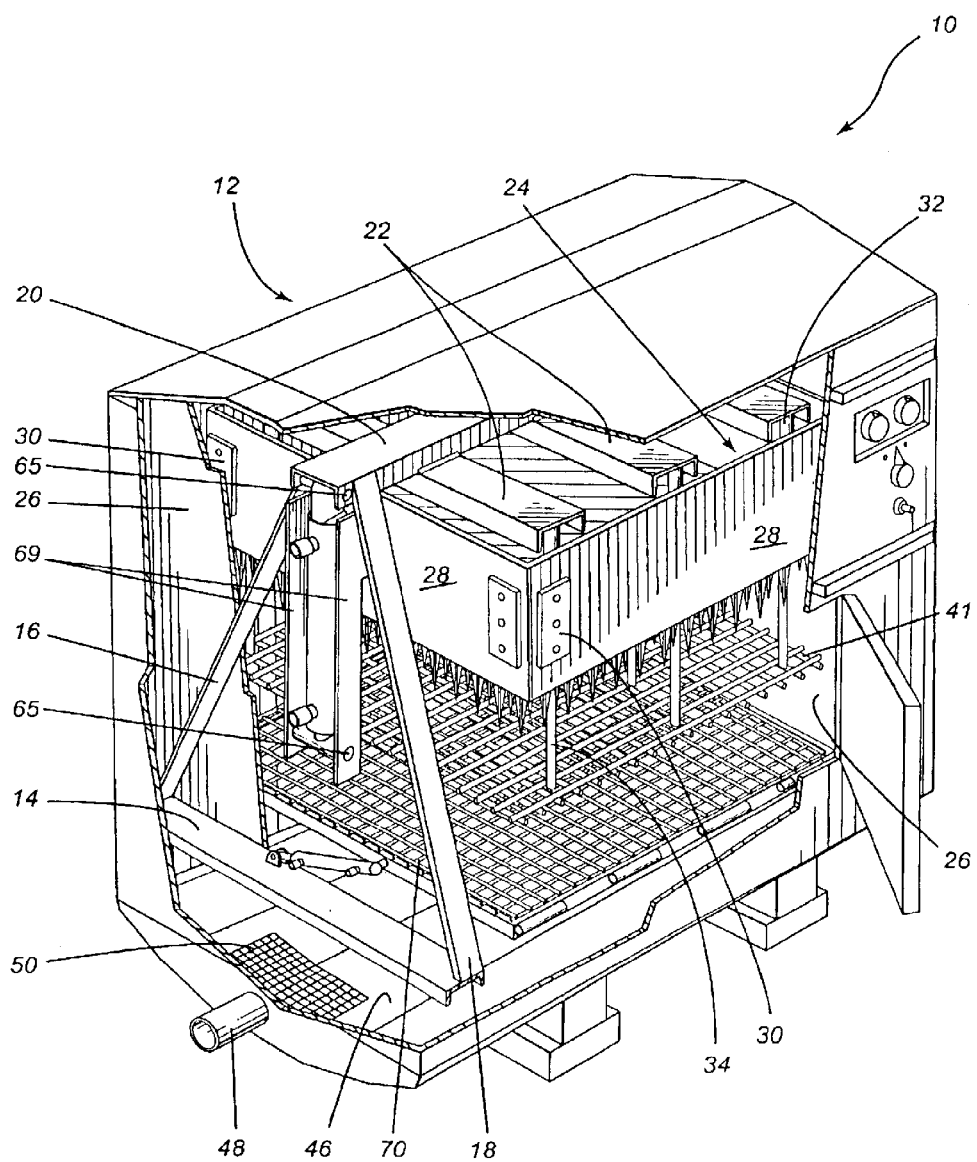
FIG. 2 is a perspective view similar to FIG. 1 with portions of the exterior housing being cut away to provide a view of the interior thereof.

Apparatus 10 includes an exterior housing 12 which may be formed of a conventional material and in any desired configuration. There is a frame structure located at either end with only one such structure being illustrated in FIG. 2 and referred to herein. This structure includes a transverse frame member 14 with diagonally extending uprights 16 and 18 being secured at either end thereof. Uprights 16 and 18 are in turn connected to an upper longitudinal frame member 20. A plurality of transverse frame members 22 are secured to upper longitudinal frame member 20. Interior end walls 26 are also provided.

Mounted within exterior housing 12 is a movable assembly generally designated by reference numeral 24 and which will now be described in greater detail.

Movable assembly 24 is rectangular in configuration and has walls 28 with anti-friction pads 30 mounted thereon. Anti-friction pads may be of any suitable material such as PTFE.

Secured to transverse frame members 22 are a plurality of upper guides 32. Mounted within upper guides 32 and slidable with respect thereto are lower guides 34.

There is provided a lower screen 36 which extends across the interior chamber and rests on suitable supports. Lower screen 36 is mounted above floor 46 of housing 12 so as to define an oil reservoir between lower screen 36 and floor 46. An outlet conduit 48 extends from the oil reservoir with a filtering screen 50 extending about the inlet to outlet conduit 48.

Figure 3:
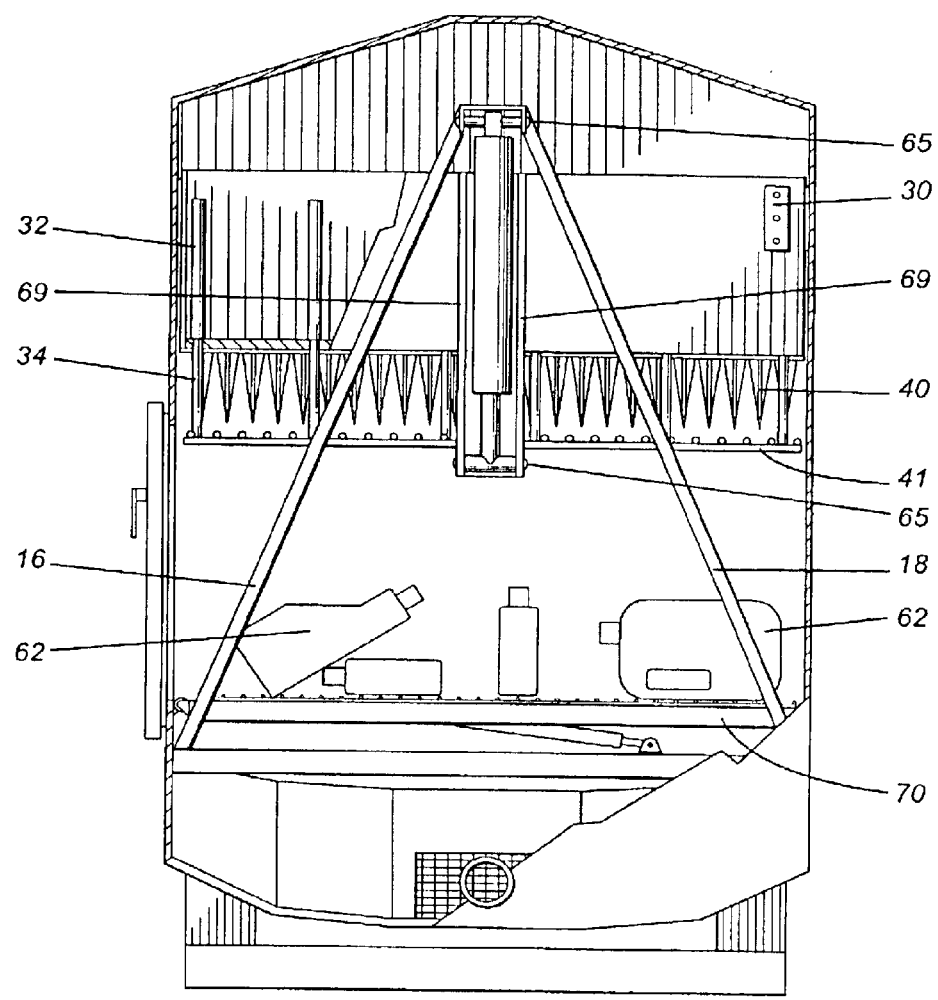
FIG. 3 is an end elevational view, with portions of the exterior housing being cut away.

There is also provided an upper screen 38 which is connected to the distal ends of lower guides 34. Mounted above upper screen 38 are a plurality of piercing members 40 which extend downwardly as may be seen in FIG. 3.

Mounted to upper longitudinal frame member 20 is a hydraulic cylinder 42 having a movable piston 44 which is connected to movable assembly 24.

As may be seen in FIG. 1, the exterior housing includes a pair of doors 52 having a suitable locking device 54 for securing the doors in a locked position when the apparatus ceases to be operated. As may be seen, housing 12 is mounted on a suitable base 60.

There is also provided control circuit means (not shown) and which are operatively connected to an On/Off switch 56 and other controls 58.

Figure 4:
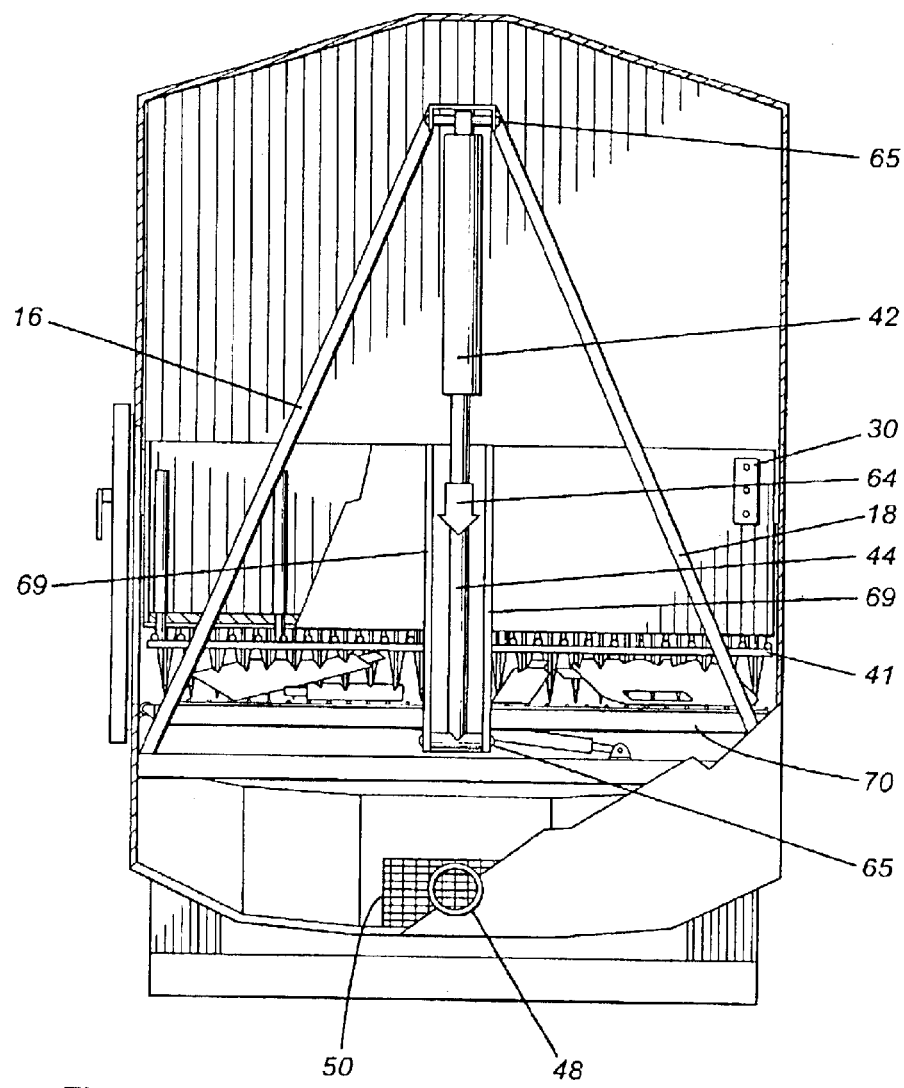
FIG. 4 is a view similar to FIG. 3 illustrating a first step in the operation of the apparatus.

In operation, the consumer may open doors 52 and place used oil containers 62 within the apparatus where they are supported on lower screen 36. When it is desired to operate the apparatus, switch 56 may be activated and cause the operation of hydraulic cylinders 42. Pistons 44 will drive movable assembly 24 downwardly to the position shown in FIG. 4 and as illustrated with arrow 64. This action will cause piercing members 40 to penetrate in numerous locations oil containers 62 supported on lower screen 36.

The action of the piercing members along with the pressure applied to the containers will cause oil to drain outwardly of the containers and through lower screen 36 to floor 46. From there, it may be pumped to an external container or merely flow by gravity to such an external container or reservoir.

Figure 5:
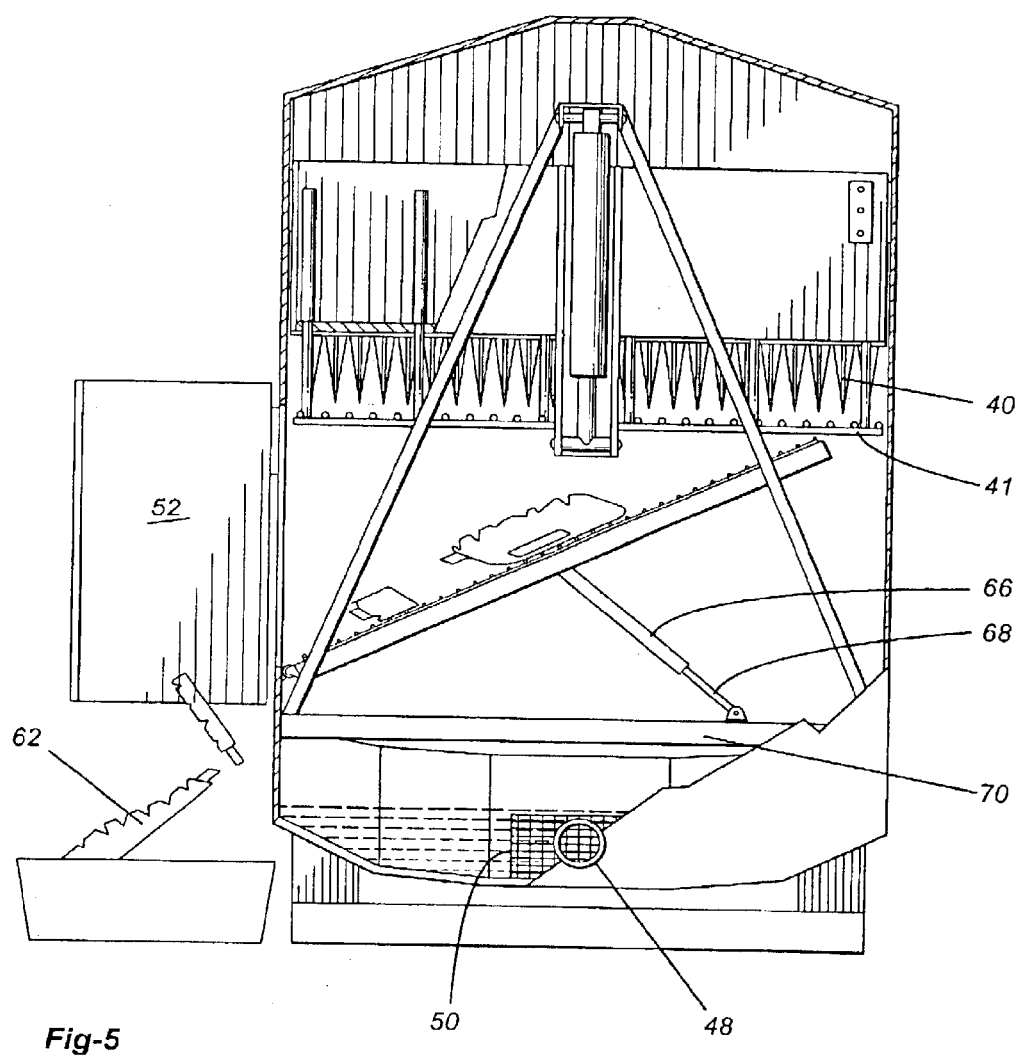
FIG. 5 is a view similar to FIGS. 3 and 4 illustrating a second step of the operation of the apparatus.

Subsequently, upon the retraction of piston 44, movable assembly 24 will move to its upper position as shown in FIG. 5. It will be noted that upper screen 38 functions to remove any containers which would otherwise remain impaled on piercing members 40.

There is also provided a second cylinder generally designated by reference numeral 66 which is operative to tiltingly move lower screen 36, shown in FIG. 5, to remove the compacted containers into a further container from where they may be recycled.

It will be understood that the above described embodiments are for purposes of illustration only and that changes or modifications may be made thereto without departing from the spirit and scope of the present invention.

I claim:

1. A recycling apparatus suitable for use with containers of used petroleum products, the apparatus comprising:
    a housing;
    a perforated shelf within said housing, said perforated shelf having apertures therein;
    an assembly movable between upper and lower positions, said assembly having a plurality of piercing members formed on an underside thereof, stripping means moveable with said assembly;
    drive means for moving said assembly between said first and second positions; and
    liquid receiving means below said perforated shelf.

2. The apparatus of claim 1 further including telescopic guides, said stripping means, being mounted on said telescopic guides such that when said assembly is in said lower position, said stripping means can apply pressure on containers on said perforated shelf.

3. The apparatus of claim 2 wherein said stripping means comprises an apertured planar member through which said piercing members pass when moving upwardly from said lower position to said upper position.

4. The apparatus of claim 1 wherein said piercing members comprise a plurality of tapered elements having an inwardly tapered point at a distal end thereof.

5. The apparatus of claim 1 wherein said drive means comprise hydraulic drive means.

6. The apparatus of claim 1 wherein said shelf extends substantially across said housing, said housing having a floor spaced from said shelf, said floor and adjacent walls forming said liquid receiving means.

7. The recycling apparatus of claim 6 further including an outlet conduit extending from said liquid receiving means.

8. A method of recovering used oil from a plurality of containers of the same, the method comprising the steps of:
    providing a recycling apparatus having a housing, a perforated shelf within the housing, an assembly movable between upper and lower positions situated above said perforated shelf, the movable assembly having a plurality of piercing members formed on an underside thereof;
    providing an access opening to said perforated shelf whereby the consumer may place containers of used oil thereon;
    operating said movable assembly to pierce said containers;
    recovering said used oil from beneath said perforated shelf and transferring said used oil to a shipping container; and
    removing said plastic containers for recycling.

9. A recycling apparatus suitable for use with containers of used petroleum products, the apparatus comprising:
    a housing;
    a perforated shelf within said housing, said perforated shelf having apertures therein;
    an assembly moveable between upper and lower positions, said assembly having a plurality of piercing members formed on an underside thereof;
    drive means for moving said assembly between said first and second positions;
    liquid receiving means below said perforated shelf; and
    means for tilting said perforated shelf to permit removal of containers therefrom.

10. The apparatus of claim 9 further including dripping means mounted on said assembly, said stripping means being operative to apply pressure on said containers when said assembly is in said lower position, and to remove containers from said piercing members when said apparatus is moved from said lower position to said upper position.

11. The apparatus of claim 10 wherein said perforated shelf extends substantially across said housing, said housing having a floor space from said shelf, said floor and adjacent walls forming said liquid receiving means.

* * * * *